United States Patent
Brasche et al.

(10) Patent No.: US 12,078,135 B2
(45) Date of Patent: Sep. 3, 2024

(54) FUEL FILTER CARTRIDGE

(71) Applicant: Caterpillar Inc., Peoria, IL (US)

(72) Inventors: Adrienne M. Brasche, Peoria, IL (US);
Michael H. McLean, Peoria, IL (US);
Kenneth C. Adams, Dunlap, IL (US);
Benjamin R. Tower, Varna, IL (US)

(73) Assignee: Caterpillar Inc., Peoria, IL (US)

( * ) Notice: Subject to any disclaimer, the term of this patent is extended or adjusted under 35 U.S.C. 154(b) by 302 days.

(21) Appl. No.: 17/487,925

(22) Filed: Sep. 28, 2021

(65) Prior Publication Data
US 2023/0109534 A1 Apr. 6, 2023

(51) Int. Cl.
| | | |
|---|---|---|
| F02M 37/32 | (2019.01) | |
| B01D 29/00 | (2006.01) | |
| B01D 29/15 | (2006.01) | |
| B01D 29/50 | (2006.01) | |
| B01D 29/88 | (2006.01) | |
| B01D 35/30 | (2006.01) | |

(52) U.S. Cl.
CPC ............. *F02M 37/32* (2019.01); *B01D 29/15* (2013.01); *B01D 29/50* (2013.01); *B01D 29/88* (2013.01); *B01D 35/30* (2013.01)

(58) Field of Classification Search
CPC .. F02M 37/32; F02M 2200/27; F02M 61/165; B01D 29/15; B01D 29/50; B01D 29/88; B01D 35/30; B01D 29/00
USPC .. 210/416.4, 167.01, 167.04, 253, 282, 314, 210/338, 345, 446, 458, 4, 55, 456
See application file for complete search history.

(56) References Cited

U.S. PATENT DOCUMENTS

| | | | |
|---|---|---|---|
| 1,964,218 A | 6/1934 | Schargorodsky | |
| 4,402,828 A * | 9/1983 | Edens | B01D 29/15 210/450 |
| 4,690,621 A | 9/1987 | Swain | |
| 8,733,555 B2 | 5/2014 | Moore et al. | |
| 2002/0005377 A1 | 1/2002 | Tanner et al. | |
| 2003/0029786 A1 | 2/2003 | Schmidt et al. | |

FOREIGN PATENT DOCUMENTS

| | | |
|---|---|---|
| DE | 102007002071 A1 | 7/2008 |
| EP | 1729006 | 12/2006 |
| EP | 1779913 B1 | 3/2016 |
| JP | S5387320 U | 7/1978 |

OTHER PUBLICATIONS

Written Opinion and International Search Report for Int'l. Patent Appln. No. PCT/US2022/042116, mailed Oct. 24, 2022 (11 pgs).

* cited by examiner

*Primary Examiner* — Madeline Gonzalez
(74) *Attorney, Agent, or Firm* — Leydig, Voit & Mayer, Ltd

(57) ABSTRACT

A multipart fuel filter element includes a cartridge body having a plurality of through bores radially offset with respect to a centerline. An inlet end cap adjacent a first cartridge face includes an inlet aperture centrally aligned with the centerline and a plurality of distribution apertures aligned with and directing fuel to the plurality of through bores. An outlet end cap adjacent a second cartridge face includes an outlet aperture also aligned with the centerline and a plurality of reception aperture that are aligned with the through bores to receive fuel.

21 Claims, 7 Drawing Sheets

FUEL FILTER CARTRIDGE

TECHNICAL FIELD

This patent disclosure relates generally to fuel filtration and more particularly to a fuel filter cartridge that can be disposed in a fuel line and that can accommodate an plurality of individual filtration rods.

BACKGROUND

Fuel systems used on large internal combustion engines typically include a fuel pump that pressurizes and directs fuel from a tank to a plurality of fuel injectors for injection into the combustion cylinders of the engine. A fuel conduit or fuel line fluidly connects the tank, fuel pump, and fuel injectors. To remove any contaminants in the fuel and avoid cogging or damaging the fuel injectors, a fuel filter cartridge may be disposed in the fuel line, for example, within a junction block mounted on the fuel pump. The fuel filter cartridge can include a cartridge body that receives a filtration rod that may be made of sintered metal or other porous media. The sintered metal can remove and trap contaminants in the fuel that is directed through the tubular filtration rod and therefore prevent contaminants from flowing onto the fuel injectors. Over time, the tubular filtration rod itself may become clogged with contaminants thereby requiring replacement of the fuel filter cartridge, otherwise the tubular fuel rods may collapse or burst potentially damaging the internal combustion engine. The present disclosure is directed to an improved design for fuel filter cartridge of the foregoing type configured to avoid possible damage to the fuel injectors and/or engine.

SUMMARY

The disclosure describes, in one aspect, a fuel filter cartridge including a cartridge body extending between a first cartridge face and a second cartridge face. The cartridge body includes a plurality of through bores disposed between the first cartridge face and the second cartridge face and a plurality of filtration rods accommodated one in the plurality of through bores. The fuel filter cartridge also includes an inlet end cap adjacent to the first cartridge face that has an inlet aperture adapted to interface with an inlet hose fitting and a plurality of distribution apertures aligned with the plurality of through bores. The fuel filter cartridge also includes an outlet end cap adjacent to the second cartridge face and that has a plurality of reception apertures aligned with the plurality of through bores and an outlet aperture adapted to interface with an outlet hose fitting.

In another aspect, there is disclosed a fuel filter cartridge that includes a cartridge body extending between a first cartridge face and a second cartridge face. The cartridge body can include a plurality of blind bores disposed into the first cartridge face toward the second cartridge face and a plurality of filtration rods accommodated one each in the plurality of blind bores. The fuel filter cartridge also includes an end cap adjacent the first cartridge face that has a first central aperture and a plurality of communication apertures aligned with and communicating with the plurality of blind bores.

In a further aspect, the disclosure describes a fuel filter cartridge including a cartridge body having a plurality of through bores that are radially offset with respect to a cartridge centerline. The plurality of through bores are exposed at a first cartridge face and at a second cartridge face of the cartridge body. The fuel filter cartridge includes an inlet end cap having an inlet aperture aligned with the centerline and a plurality of distribution channels angularly offset with respect to the centerline to establish fluid communication between the inlet aperture and the plurality of through bores at the first cartridge face. The fuel filter cartridge also includes an outer end cap having an outlet aperture aligned with the centerline and a plurality of reception channels angularly offset with respect to the centerline to establish fluid communication between the outlet aperture and the plurality of through bores at the second cartridge face.

DETAILED DESCRIPTION

Figure 1:
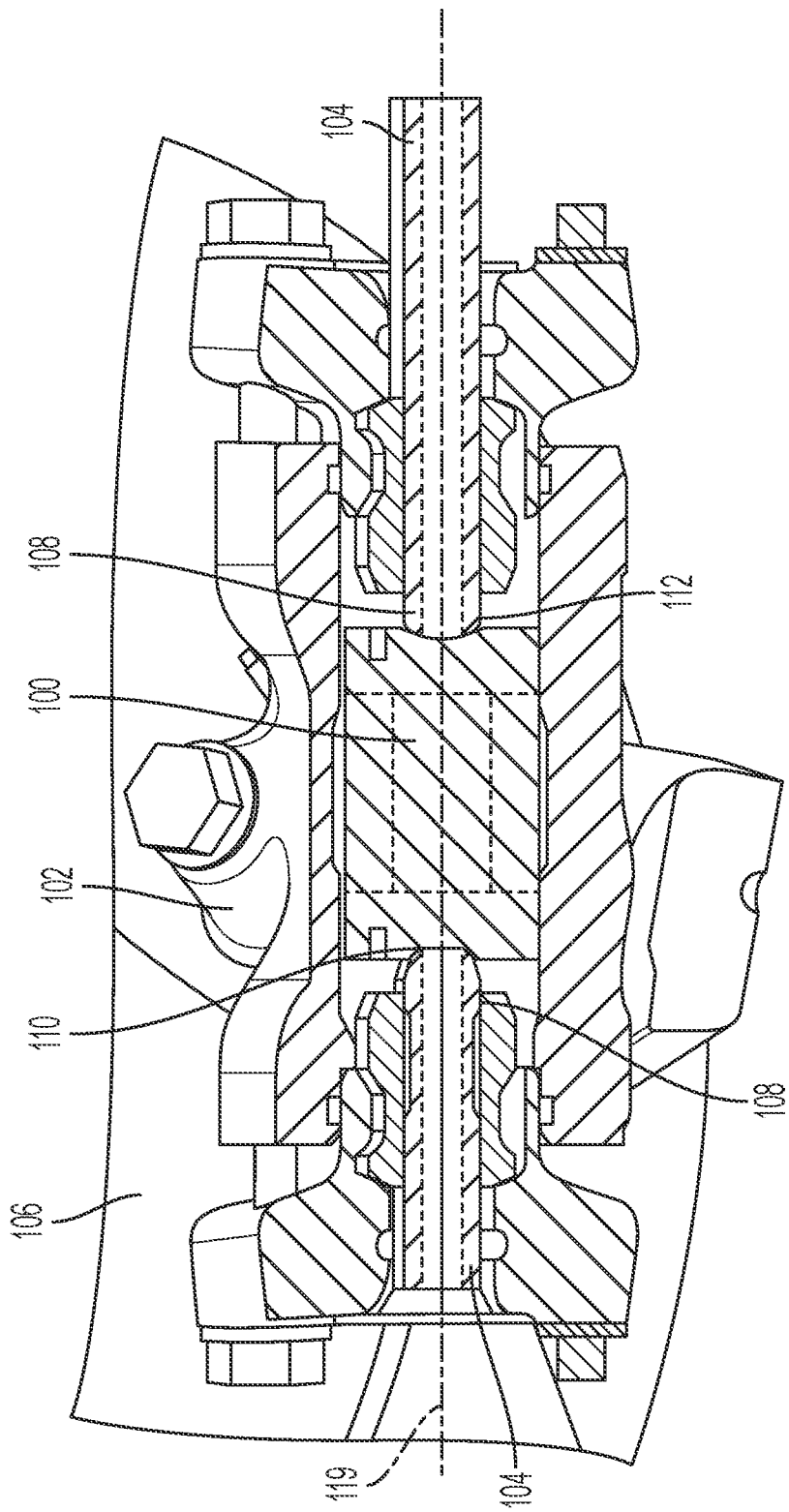
FIG. 1 is a cross-sectional view of a junction block mounted to a fuel pump through which the fuel line runs and that can accommodate a fuel filter cartridge designed in accordance with the disclosure.

Now referring to the figures, wherein whenever possible like reference numbers refer to like elements, there is illustrated a fuel filter cartridge 100 accommodated in a junction block 102 that interconnects two fuel line 104 so that fuel is directed through the fuel filter cartridge. In the illustrated embodiment, the junction block 102 can be mounted on a portion of the fuel pump 106 that receives and pressurizes fuel from a reservoir or fuel tank and directs the pressurized fuel to fuel injectors operatively associated with the combustion chambers of an internal combustion engine. The internal combustion engine may be a compression ignition engine and the fuel may be diesel. The fuel lines interconnected by the junction block 102 can be rigid tubular conduits or may be flexible hoses. To interface with the fuel lines 104 that can terminate in hose fittings 108, the fuel filter cartridge 100 can include an inlet aperture 110 and an outlet aperture 112 that may be formed as concavities disposed into the body of the cartridge. The distal ends of the hose fittings 108 on the fuel line 104 can have a correspondingly rounded shape or convexity and can be made to abut with the respective inlet aperture 110 and outlet aperture 112. Accordingly, pressurized fuel can flow directly between the fuel lines 104 and the fuel filter cartridge 100 without leakage or spillage. Threaded hose couplings or similar structures on the fuel lines 104 can mate with the junction block 102 to maintain the hose fittings 108 in abutment with the inlet aperture 110 and the outlet aperture 112 of the fuel filter cartridge 100.

Figure 2:
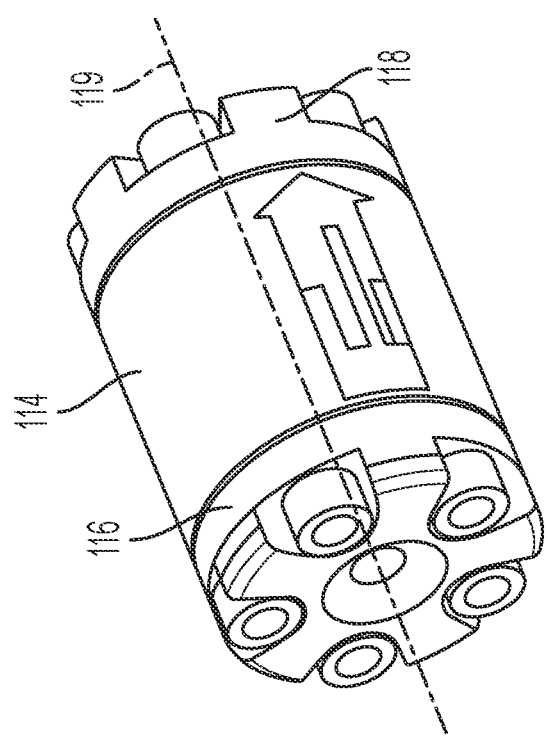
FIG. 2 is a perspective view of the fuel filter cartridge assembled from a cartridge body, an inlet end cap, and an outlet end cap secured together by a plurality of fasteners.

Referring to FIG. 2, the fuel filter cartridge 100 in accordance with the disclosure may be a multipart assembly and can be assembled from a cartridge body 114 with an inlet end cap 116 and an outlet end cap 118. It should be noted that, per the disclosure, the terms "inlet" and "outlet" are for reference purposes only and the fuel filter cartridge 100 may be reversible with either end cap functioning as the inlet and/or outlet. The cartridge body 114 can be generally cylindrical in shape and the inlet end cap 116 and the outlet end cap 118 can be circular and can be secured to the ends of the cylindrical cartridge body 114. The cylindrical cartridge body 114 and the circular inlet and outlet end caps 116, 118 thereby delineate a cartridge centerline 119 extending through the fuel filter cartridge 100. The inlet aperture 110 of the inlet end cap 116 and the outlet aperture 112 of the outlet end cap 118 may be centrally located and axially aligned with the cartridge centerline 119. To secure the assembled fuel filter cartridge 100 together, a plurality of threaded fasteners can pass through the inlet and outlet end caps 116, 118 and into the cartridge body 100. The cartridge body 114 and the inlet and outlet end caps 116, 118 can be made of any suitable material that provides structural rigidity and can be machined in accordance with the disclosure.

Figure 3:
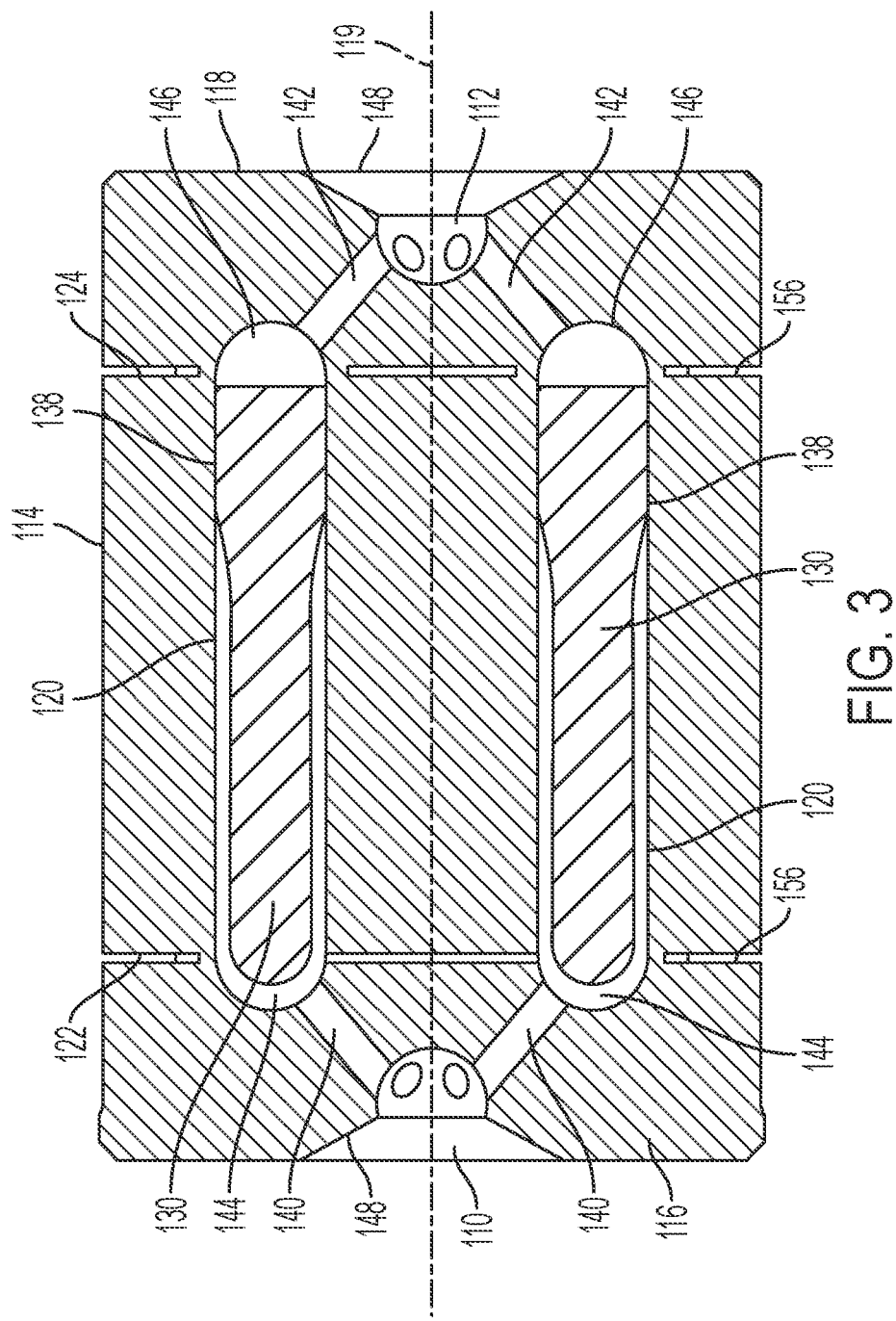
FIG. 3 is a cross sectional view of the fuel filter cartridge with a plurality of filtration rods accommodated in a plurality of through bores disposed in the cartridge body and the inlet end cap and the outlet end cap establishing fluid communication with the plurality of through bores.

Referring to FIG. 3, to accommodate filtration media that the fuel will be directed through, the cartridge body 114 of the fuel filter cartridge 100 can include a plurality of through bores 120. The through bores 120 can extend between and are exposed through a first cartridge face 122 and an opposite second cartridge face 124 that are located at the axial ends of the cylindrically shaped cartridge body 114 and accordingly the through bores 120 extend over the axial length of the cartridge body 114. The through bores 120 can be circular with diameters substantially less than the diameter of the cartridge body 114 and can be formed by a cutting process like drilling or boring a hole from, for example, the first cartridge face 122 to the second cartridge face 124. The plurality of through bores 120 can be radially offset with respect to the cartridge centerline 119 and can be angularly arranged at different angular locations with respect to the cartridge centerline 119.

Figure 4:
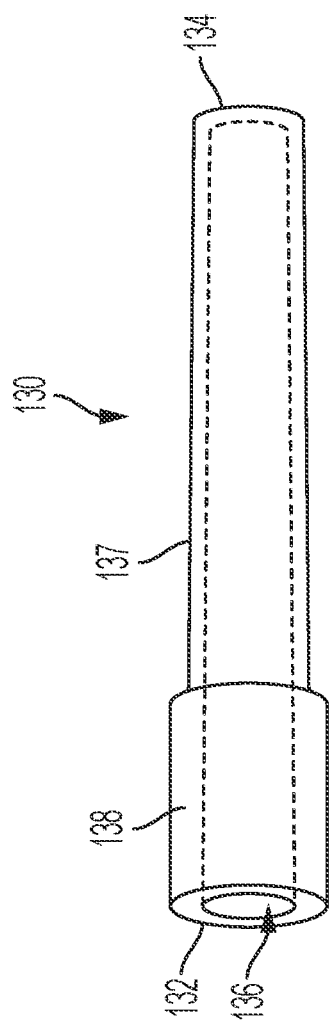
FIG. 4 is a perspective view of an embodiment of a filtration rod that can be accommodated in the fuel filter cartridge that may be manufactured from a sintered metal or other porous media.

Referring to FIGS. 3 and 4, in an embodiment, the filtration media of the fuel filter cartridge 100 can be in the form of a plurality of filtration rods 130. The filtration rods 130 can be elongated structures and may be generally coextensive in length with the axial length of the cartridge body 114. The filtration rods 130 can be hollow and can include an opened end 132 and a closed end 134 thereby forming a rod interior 136 that is accessible via the opened end 132 and closed or blinded at the closed end 134. The filtration rods 130 can be made from sintered metal or other porous media so that pressurized fuel passing into the rod interior 136 from the exterior surface 137 of the body of the filtration rod 139 enables the sintered metal or other porous media to retain and separate contamination in the fuel. To provide a clearance between the exterior surface 137 of the filtration rod 130 and interior surface of the through bore 120 to allow unfiltered fuel to flow unobstructed about the exterior surface 137 and enter the body of the filtration rod 130, the outer diameter of the filtration rods 130 can be slightly less than the inner diameter of the through bores 120.

To retain the filtration rods 130 in the through bores 120, the filtration rods can include a press fit boss 138 formed around, for example, the exterior of the opened end 132. The press fit boss 138 extends along a portion of the length of the filtration rod 130 and can have a diameter dimensioned to create an interference fit or friction fit with the through bore 120, thus the press fit boss 138 has a larger diameter than the remaining length of the filtration rod 130. The filtration rods 130 can be inserted and retained in the through bores 120 by the press fit boss 138 and may become a fixed part of the cartridge body 114. It will be appreciated that while the foregoing embodiment of the fuel filter cartridge 100 has been described as utilizing filtration rods, the fuel filter cartridge may utilize other filtration media can that can be accommodated in a plurality of through bores 120.

Referring to FIG. 3, to direct and distribute fuel entering the fuel filtration cartridge 100 at the centrally located inlet aperture 110 of the inlet end cap 116 to the radially offset plurality of through bores 120 in the cartridge body 114, the inlet end cap 116 can have disposed therein a plurality of distribution channels 140. Likewise, to receive and direct fuel from the plurality of radially offset through bores 120 of the cartridge body 114 to the centrally located outlet aperture 112 of the outlet end cap 118, the outlet end cap 118 can have disposed therein a plurality of reception channels 142. For example, each distribution channel 140 may initiate at the central inlet aperture 110 and terminate at a distribution aperture 144 that is aligned with one of the through bores 120 and each reception channel 142 may initiate at the central outlet aperture 112 and terminate at a reception aperture 146 aligned with one of the through bores 120 thus establishing fluid communication between the inlet and outlet apertures 110, 112 of the respective inlet and outlet end caps 116, 118 and the through bores 120 of the cartridge body 114. As illustrated, the plurality of distribution channels 140 and the plurality of reception channels 142 extend from the respective inlet aperture 110 and outlet aperture 112 at an angle with respect to the cartridge centerline 119. The angled orientation with respect to the cartridge centerline 119 enables the distribution channels 140 and reception channels 142 to extend to the radially offset distribution apertures 144 and reception apertures 146.

In an embodiment, to form the angled distribution channels 140 in the inlet end cap 116 and the angled reception channels 142 in the outlet end cap 118, a drill bit or similar rotary cutting tool can be inserted into the inlet aperture 110 and the outlet aperture 112, respectively, at an angle with respect to the cartridge centerline 119. Holes corresponding to the angled distribution and reception channels 140, 142 are drilled through the material of the inlet and outlet end caps 116, 118 to break through to the distribution apertures 144 and reception apertures 146 that are radially offset with respect to the cartridge centerline 119. To facilitate angled drilling of the distribution and reception channels 140, 142, the inlet aperture 110 and the outlet aperture 112 may each be associated with a conical tool access countersink 148.

Figure 5:
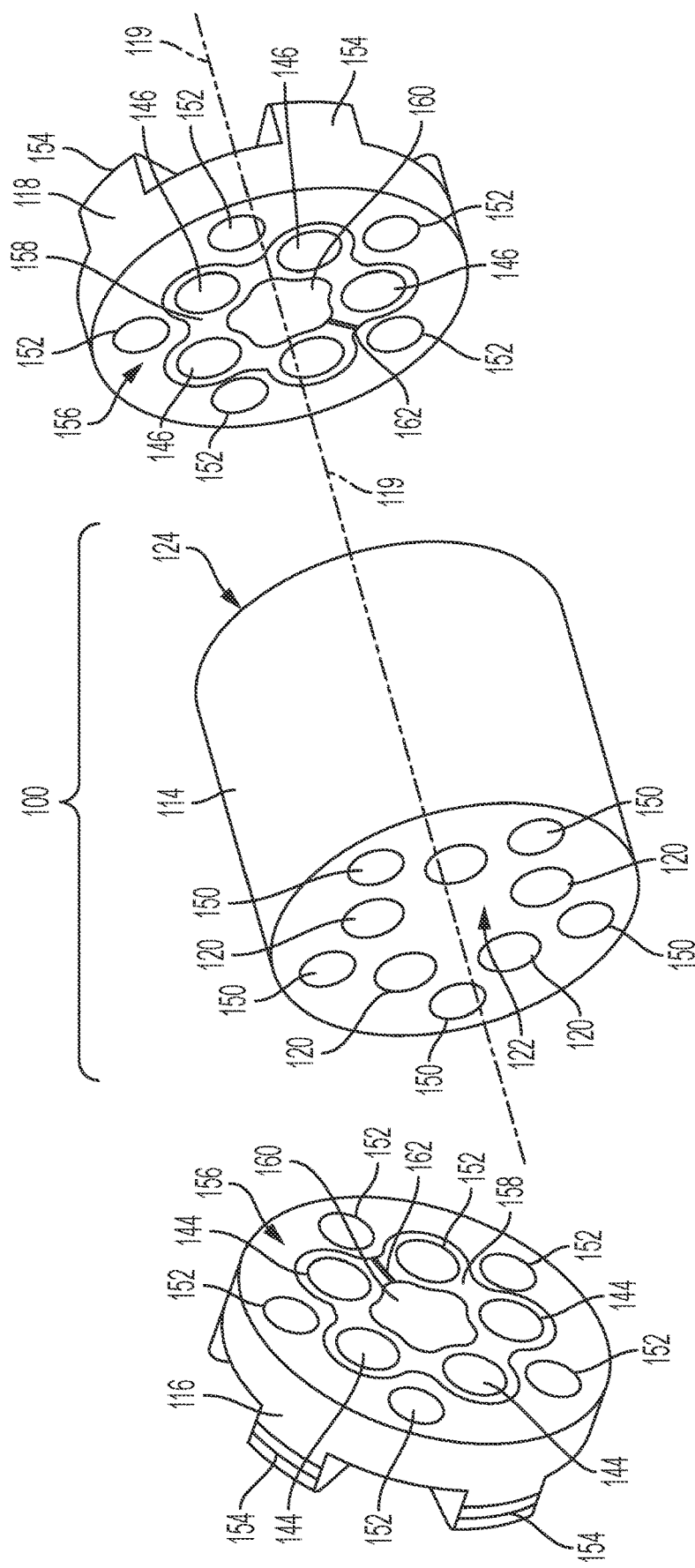
FIG. 5 is an assembly view of the components of the fuel filter cartridge including the cartridge body and the inlet and outlet end caps.

Referring to FIG. 5, to secure the cartridge body 114 with inlet end cap 116 and the outlet end cap 118, a plurality of fastener bores 150 can be disposed into the first and second cartridge faces 122, 124 of the cartridge body 114. Five fastener bores 150 are illustrated in the embodiment of FIG. 5, but more or less could be included. A corresponding number of fastener bores 152 are included in the inlet and outlet end caps 116, 118 and are arranged to align with the fastener bores 150 in the cartridge body 114. The fastener bores 150, 152 can be radially offset with respect to the cartridge centerline 119 and are disposed radially outward of the through bores 120 in the cartridge body 114 and the distribution and reception apertures 144, 146 of the respectively inlet and outlet end caps 116, 118. Threaded fasteners can be inserted through the fastener bores 152 of the inlet and outlet end caps 116, 118 and can form a threaded engagement with the fastener bores 150 in the cartridge body 114. In an embodiment, to facilitate insertion of the fasteners, raised bosses 154 that extend radially from the cartridge centerline 119 can be formed on the inlet and outlet end caps 116, 118 that separate the radially arranged fastener bores 152 disposed therein.

Thus, the inlet end cap 116 is secured adjacently to the first cartridge face 122 and the outlet end cap 118 is secured adjacently to the second cartridge face 124. The inlet and outlet end caps 116, 118 may each include a planar, circular cap abutment face 156 that is adjacent to the respective first and second cartridge faces 122, 124 at the axial ends of the cylindrical cartridge body 114. The distribution apertures 144 and the reception apertures 146 are formed within the cap abutment faces 156 of the inlet and outlet end caps 116, 118 and are caused to align in fluid communication with the through bores 120 in the cartridge body 114 by effect of the fasteners inserted in the fastener bores 150, 152 disposed in the respective cartridge body 114 and the inlet and outlet end caps 116, 118.

In an embodiment, to ensure that fuel directly flows between the distribution and reception apertures 144, 146, and the through bores 120 without leakage, for example, due to capillary action between the cap abutment faces 156 and the first and second cartridge faces 122, 124, a raised sealing surface 158 can be formed on each of the cap abutment faces 156 of the inlet end cap 116 and the outlet end cap 118. In the illustrated embodiment, the raised sealing surfaces 158 can be disposed about and surrounding each of the plurality of distribution apertures 144 of the inlet end cap 116 and about each of the plurality of reception apertures 146 of the outlet end cap 118. In other embodiments, each of the distribution and/or reception apertures 144, 146 may be individually associated with a distinct raised sealing surface 158. The raised sealing surface 158 may be offset or raised with respect to the rest of the cap abutment face 156 by a slight distance and may be lapped or ground to provide a smooth, flat finish for contacting the first and second cartridge faces 122, 124 of the cartridge body 114.

In an embodiment, to enhance sealing between the cap abutment faces 156 of the inlet and outlet end caps 116, 118 and the respective first and second cartridge faces 122, 124 of the cartridge body 114, a pressure relief cutout 160 can be disposed into the raised sealing surface 158. The pressure relief cutout 160 can be centrally located with respect to the circular inlet and outlet end caps 116, 118 and can be aligned with the cartridge centerline 119. The pressure relief cutout 160 can have any suitable shape and configuration and serves to provide a void between the raised sealing surfaces 158 and the respective first and second cartridge faces 122, 124 at the location of the cartridge centerline 119 of the fuel filter cartridge 100. A pressure relief groove 162 can be disposed through the raised sealing surface 158 to establish fluid communication between the centrally located pressure relief cutaway 160 and at least one of the fastener bores 152 in the inlet and outlet end caps 116, 118. The pressure relief groove 162 can release pressure that may otherwise build up between the first and second cartridge faces 122, 124 and the respective cap abutment faces 156 in the area proximate of the cartridge centerline 119.

In the embodiment illustrated in FIG. 5, there are five through bores 120 disposed in the cartridge body 114 that can accommodate a total of five filtration rods. The five through bores 120 are further arranged in a pentagram about the cartridge centerline 119. In other embodiments of the fuel filter cartridge 100, a greater or less number of through bores 120 can be included in different arrangements.

Figure 6:
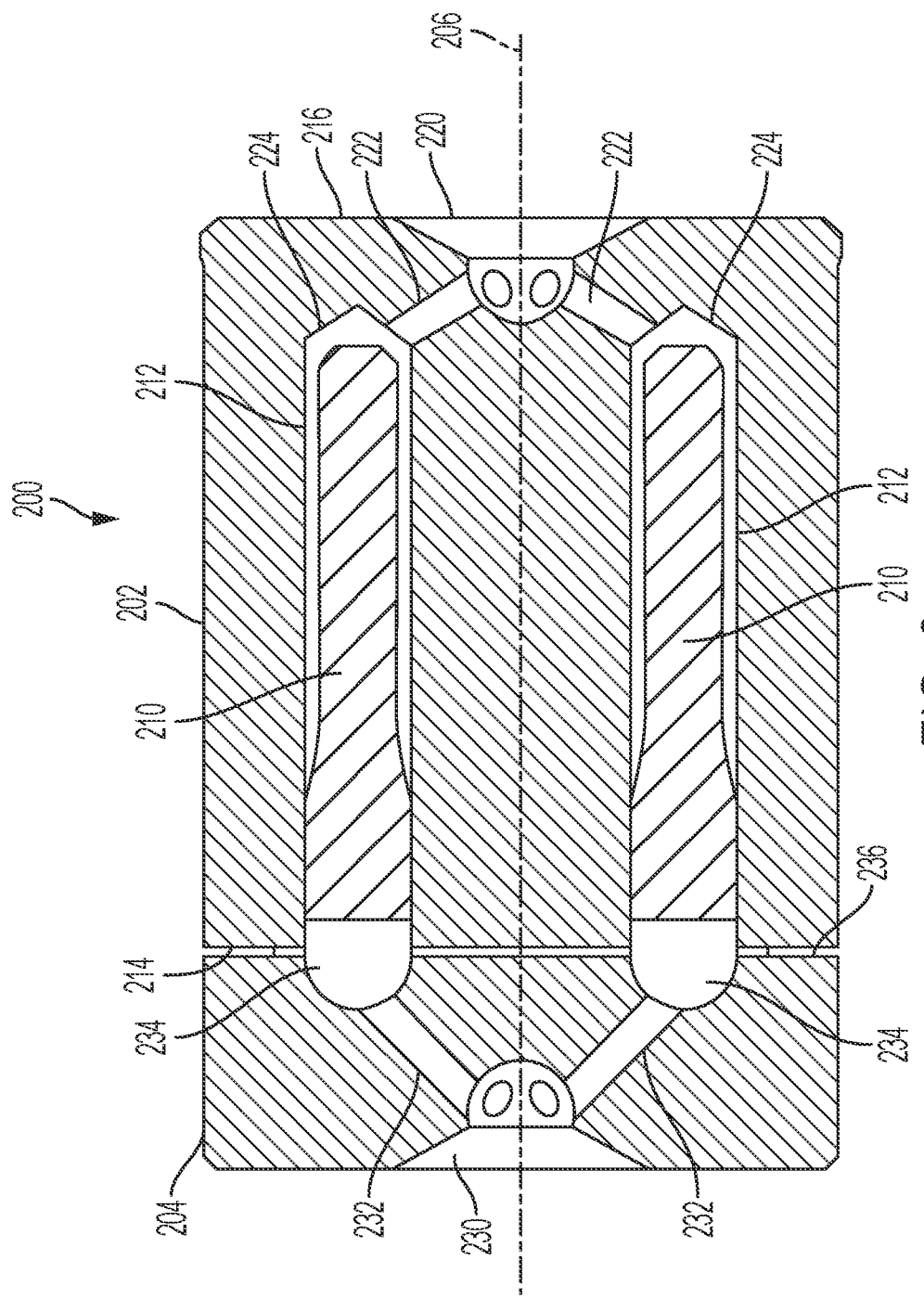
FIG. 6 is a cross sectional view of another embodiment of a fuel filter cartridge assembled from a cartridge body with a plurality of through bores disposed therein and a single end cap.

Referring to FIG. 6, there is illustrated another embodiment of a multipart fuel filter cartridge 200 designed in accordance with the disclosure that includes a cartridge body 202 and a single end cap 204 that is secured to an axial end of the cartridge body. The cartridge body 202 may be cylindrical in shape and the end cap 204 may be round such that the two are commonly aligned with a cartridge centerline 206. To accommodate a plurality of filtration rods 210, the cartridge body 202 can include a plurality of bores 212 disposed therein and radially offset with respect to the cartridge centerline 206. In contrast to the prior embodiment, the bores 212 may be formed as blind holes or blind bores in that the bores 212 are disposed into a first cartridge face 214 at one axial end of the cartridge body 202 and terminate short of the second cartridge face 216 at the other axial end of the cartridge body 202. The length of the bores 212 is thus less than the axial length of the cylindrical cartridge body 202.

To receive fuel to be filtered from a fuel line that may be fluidly communicating with a fuel pump, the cartridge body 202 can have a first central aperture 220 disposed in the second cartridge face 216 that is axially aligned with the cartridge axis 206. To direct fuel from the first central aperture 220 to the radially offset blind bores 212, a first plurality of communication channels 222 can extend from the first central aperture 220 to a first plurality of communication apertures 224 corresponding in number to the blind bores 212 and radially arranged about the cartridge centerline 206. The first plurality of communication channels 222 may also be disposed at an angle with respect to the cartridge centerline 206 to align and communicate with the radially offset blind bores 212 in the cartridge body 202.

A cap abutment face 236 of the end cap 204 may be secured adjacent to the first cartridge face 214 by, for example, fasteners and may be configured as an outlet end cap; however, in other embodiments, the end cap 204 may be readily configured as an inlet end cap and the flow of fuel through the fuel filter cartridge 200 can be reversed. To direct filtered fuel from the fuel filter cartridge 200, a second central aperture 230 can be disposed in the end cap 204 on the face opposite the cap abutment face 236. The second central aperture 230 can also be centrally located with respect to the round end cap 204 and aligned with the cartridge centerline 206. To direct fuel from the radially offset blind bores to the second central aperture 230, a second plurality of communication channels 232 can extend from the second central aperture 230 to a second plurality of communication apertures 234 corresponding in number to the blind bores 212 and radially arranged about the cartridge centerline 206 at the cap abutment face 236. The second plurality of communication channels 232 may also be disposed at an angle with respect to the cartridge centerline 206 to align and communicate with the radially offset blind bores 212 in the cartridge body 202. Filtered fuel may therefore flow from the radially offset blind bores 212 to the second central aperture 230 of the end cap 204. The cap abutment face 236 of the end cap 204 may include the raised sealing surface and the pressure relief cutout and pressure relief groove disclosed above.

Figure 7:
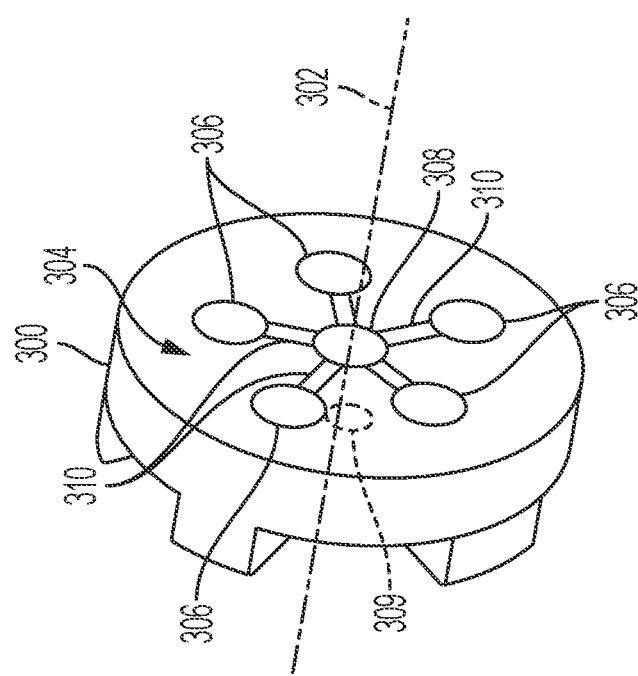
FIG. 7 is a perspective view of another embodiment of the cap abutment face of an end cap having a single central aperture and a plurality of communication apertures in fluid communication via a plurality of communication channels disposed in the cap abutment face.

Referring to FIG. 7, there is illustrated another embodiment of an end cap 300 that may be configured as either an inlet end cap or an outlet end cap. As in the foregoing embodiments, the end cap 300 can be circular in shape and can define a cartridge centerline 302 about which the other components of the multipart fuel filter cartridge can align when assembled together. A planar cap abutment face 304 of the end cap 300 can include a plurality of communication apertures 306 that are radially offset with respect to the cartridge centerline 302 and that are intended to align in fluid communication with a respect plurality of through bore or blind bores accommodating filtration rods or the like. Also disposed in the cap abutment face 304 can be a central aperture 308 that is centrally located with respect to the cartridge centerline 302. The central aperture 308 is located within and radially surrounded by the plurality of communication aperture 306. The central aperture 308 can be in fluid communication with another central aperture 309, which may be configured as either an inlet aperture or and outlet aperture, that is disposed on the side of the end cap 300 opposite the cap abutment face 304.

To establish fluid communication and direct fuel between the central aperture 308 and the radially offset communication apertures 306, a plurality of communication grooves 310 can be formed in the cap abutment face 304 of the end cap 300. The communication grooves 310 can extend radially from the central aperture 308 to each of the plurality of communication apertures 306 and are thus radially arranged with respect to the cartridge centerline 302. Further, the communication grooves 310 are perpendicular or normal to the cartridge centerline 302 in contrast to being disposed at an axial angle with respect to the cartridge centerline 302. The communication grooves 310 can be formed by any suitable manufacturing process such as, for example, by conducting an end milling operation on the cap abutment face 304.

INDUSTRIAL APPLICABILITY

Referring to FIG. 3 and generally to the other figures, pressurized fuel may be directed to the inlet aperture 110 centrally located in a circular inlet end cap 116 of the fuel filter cartridge 100. The inlet aperture 110 can be configured to interface with a hose fitting 108 on a fuel line 104 in a leak tight manner. Because of the central location of the inlet aperture 110, which may align with the cartridge centerline 119 of the fuel filter cartridge 100, the fuel filter cartridge 100 can be installed in an existing junction block 102 with the central inlet aperture 110 pre-aligned with the fuel line 104 that is directed into the junction block 102 and that is centrally secured by the structure of the junction block 102.

The pressurized fuel entering the central inlet aperture 110 can be directed to a plurality of radially offset through bores 120 in the cartridge body 114 by a plurality of distribution channels 140 that are disposed in the inlet end cap 116 at an angular offset with respect to the cartridge centerline 119 of the fuel filter cartridge 100. The pressurized fuel flowing in the through bores 120 may around and into the plurality of filtration rods 130 accommodated one each in the plurality of through bores 120 and that extend between a first cartridge face 122 adjacent the inlet end cap 116 and a second cartridge face 124 adjacent an outlet end cap 118. The filter fuel exiting the plurality of filtration rods 130 may be directed from the plurality of radially through bores 120 to an outlet aperture 112 centrally located in the outlet end cap 116 and aligned with the cartridge centerline 119 of the fuel filter cartridge 100.

A possible advantage of the disclosure is the redundancy created by accommodating a plurality of filtration rods 130 in a fuel filter cartridge 100 such that the failure or clogging of one filtration rod 130 can be compensated for by the other fuel rods. Another possible advantage is that the multipart construction of the fuel filter cartridge 100, including a cartridge body 114 to accommodate the filtration rods 130 in radially offset bores and one or more end caps 116, 118 to direct fuel to the radially offset bores, facilitates manufacturing of the fuel filter cartridge 100. These and other possible advantages and features of the disclosure will be apparent from the foregoing detailed description and accompanying drawings.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A fuel filter cartridge comprising:
    a cartridge body extending between a first cartridge face and a second cartridge face, the cartridge body including a plurality of through bores disposed between the first cartridge face and the second cartridge face;
    a plurality of filtration rods accommodated one each in the plurality of through bores;
    an inlet end cap adjacent the first cartridge face, the inlet end cap having an inlet aperture adapted to interface with an inlet hose fitting, and a plurality of distribution apertures aligned with the plurality of through bores at the first cartridge face; and
    an outlet end cap adjacent the second cartridge face, the outlet end cap including a plurality of reception apertures and an outlet aperture, the plurality of reception apertures being aligned with the plurality of through bores at the second cartridge face and the outlet aperture being adapted to interface with an outlet hose fitting.

2. The fuel filter cartridge of claim 1, wherein the cartridge body is shaped as a cylinder extending between the first cartridge face and the second cartridge face.

3. The fuel filter cartridge of claim 2, wherein the plurality of through bores in the cartridge body are radially offset with respect to a centerline of the fuel filter cartridge.

4. The fuel filter cartridge of claim 3, wherein the inlet end cap and the outlet end cap are each circular in shape.

5. The fuel filter cartridge of claim 4, wherein the inlet aperture and the outlet aperture are located at a center point of the inlet end cap and the outlet end cap respectively.

6. The fuel filter cartridge of claim 5, wherein the inlet end cap includes a plurality of distribution channels establishing fluid communication between the inlet aperture and the plurality of distribution apertures.

7. The fuel filter cartridge of claim 6, wherein the outlet end cap includes a plurality of reception channels establishing fluid communication between the plurality of reception apertures and the outlet aperture.

8. The fuel filter cartridge of claim 1, wherein the cartridge body, the inlet end cap, and the outlet end cap each include a plurality of fastener bores disposed therethrough and aligned together to receive a plurality of fasteners that secure the cartridge body, inlet end cap, and outlet end cap together.

9. The fuel filter cartridge of claim 8, wherein the inlet end cap includes a first cap abutment face adjacent to the first cartridge face and the outlet end cap includes a second cap abutment face adjacent the second cartridge face.

10. The fuel filter cartridge of claim 9, wherein the inlet end cap includes a first raised sealing surface on the first cap abutment face disposed about each of the plurality of distribution apertures and the outlet end cap includes a second raised sealing surface on the second cap abutment face disposed about each of the plurality of reception apertures.

11. The fuel filter cartridge of claim 10, wherein the inlet end cap includes a pressure relief cutout disposed on the first cap abutment face and a pressure relief groove disposed through the first raised sealing surface establishing fluid communication between the pressure relief cutout and at least one of the plurality of fastener bores.

12. The fuel filter cartridge of claim 10, wherein the outlet end cap includes a pressure relief cutout disposed on the second cap abutment face and a pressure relief groove disposed through the second raised sealing surface establishing fluid communication between the pressure relief cutout and at least one of the plurality of fastener bores.

13. The fuel filter cartridge of claim 12, wherein each of the plurality of filtration rods includes a press fit boss disposed around one of the opened end and the closed end and dimensioned to form a press fit with a respective one of the plurality of through bores.

14. The fuel filter cartridge of claim 1, wherein the each of the plurality of filtration rods is hollow and extends between an opened end and a closed end.

15. A fuel filter cartridge comprising:
a first end and a second end opposite the first end;
a cartridge body having a first cartridge face and a second cartridge face, the cartridge body including a plurality of bores disposed into the first cartridge face toward the second cartridge face;
a plurality of filtration rods accommodated one each in the plurality of bores;
an end cap adjacent the first cartridge face, the end cap including a first central aperture at the first end and a plurality of communication apertures, the communication apertures aligned and communicating with the plurality of bores at the first cartridge face; and
a second central aperture at the second end, the second central aperture aligned with a centerline of the fuel filter cartridge and in fluid communication with the plurality of bores of the cartridge body.

16. The fuel filter cartridge of claim 15, wherein the end cap includes a first plurality of communication channels establishing fluid communication between the first central aperture and the plurality of communication apertures.

17. The fuel filter cartridge of claim 16, wherein the cartridge body includes a second plurality of communication channels establishing fluid communication between the plurality of bores and the second central aperture.

18. The fuel filter cartridge of claim 17, wherein the plurality of bores of the cartridge body are blind bores that are open at the first cartridge face.

19. A fuel filter cartridge comprising:
a cartridge body including a plurality of through bores radially offset with respect to a cartridge centerline of the fuel filter cartridge, the plurality of through bores exposed at a first cartridge face and at a second cartridge face;
an inlet end cap including an inlet aperture aligned with the centerline and a plurality of distribution channels angularly offset with respect to the centerline and establishing fluid communication between the inlet aperture and the plurality of through bores at the first cartridge face; and
an outer end cap including an outlet aperture aligned with the centerline and a plurality of reception channels angularly offset with respect to the centerline and establishing fluid communication between the outlet aperture and the plurality of through bores at the second cartridge face.

20. The fuel filter cartridge of claim 19, wherein the inlet end cap and the outlet end cap each includes a raised sealing surface on a cap abutment face adjacent to the first cartridge face and the second cartridge face respectively.

21. The fuel filter cartridge of claim 20, wherein the inlet end cap and the outlet end cap each includes a pressure relief cutout in the raised seal surface and a pressure relief groove disposed through the raise sealing surface fluid establishing communication between the pressure relief cutout and at least one of a plurality of fastener bores.

* * * * *